(12) United States Patent
Kötter et al.

(10) Patent No.: US 7,155,328 B2
(45) Date of Patent: Dec. 26, 2006

(54) DEVICE AND METHOD FOR DETERMINING GEARBOX POSITIONS IN AN AUTOMATIC GEARBOX

(75) Inventors: Thomas Kötter, Regensburg (DE); Horst Palitza, Regensburg (DE); Hermann Zippold, Burgthann (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/951,379

(22) Filed: Sep. 28, 2004

(65) Prior Publication Data

US 2005/0043878 A1    Feb. 24, 2005

Related U.S. Application Data

(63) Continuation of application No. PCT/DE03/01110, filed on Apr. 3, 2003.

(30) Foreign Application Priority Data

Apr. 5, 2002    (DE) ................ 102 15 116

(51) Int. Cl.
*B62D 5/04*    (2006.01)
*G05F 1/10*    (2006.01)
(52) U.S. Cl. .................. 701/51; 74/335; 464/46
(58) Field of Classification Search .............. 701/51; 74/335, 665 B, 665 E, 336 R, 640, 721; 464/46; 192/70.14; 180/431, 432
See application file for complete search history.

(56) References Cited

U.S. PATENT DOCUMENTS

| | | | | | |
|---|---|---|---|---|---|
| 2,963,115 | A | * | 12/1960 | Peras | 188/69 |
| 3,884,320 | A | * | 5/1975 | Auguste Leveau | 180/431 |
| 4,833,906 | A | * | 5/1989 | Potucek | 72/206 |
| 5,551,917 | A | * | 9/1996 | Wood | 464/46 |
| 5,635,809 | A | * | 6/1997 | Ganser et al. | 318/650 |
| 5,688,205 | A | * | 11/1997 | Buhler | 477/110 |
| 6,155,376 | A | * | 12/2000 | Cheng | 180/444 |
| 6,264,138 | B1 | * | 7/2001 | Hawkins | 244/60 |
| 6,675,667 | B1 | * | 1/2004 | Pelletier et al. | 74/333 |
| 6,851,326 | B1 | * | 2/2005 | Wild et al. | 74/335 |

FOREIGN PATENT DOCUMENTS

| | | |
|---|---|---|
| DE | 40 39 842 C1 | 1/1992 |
| DE | 196 28 099 A1 | 1/1998 |
| EP | 0 432 507 A2 | 11/1990 |
| EP | 1 113 195 A1 | 12/2000 |
| WO | WO 01/98689 A1 | 12/2001 |

* cited by examiner

*Primary Examiner*—Dalena Tran
(74) *Attorney, Agent, or Firm*—Baker Botts L.L.P.

(57) ABSTRACT

A device and a method for determining positions of an automatic gearbox comprises a notched disk (1), an adjustment device for rotating the notched disk (1), a first sensor (14) for measuring the applicable torque, a second sensor (16) for determining the position of the notched disk (1), and a regulating device (15). The method determines the exact position of the notched disk (1) in a plurality of steps.

21 Claims, 2 Drawing Sheets

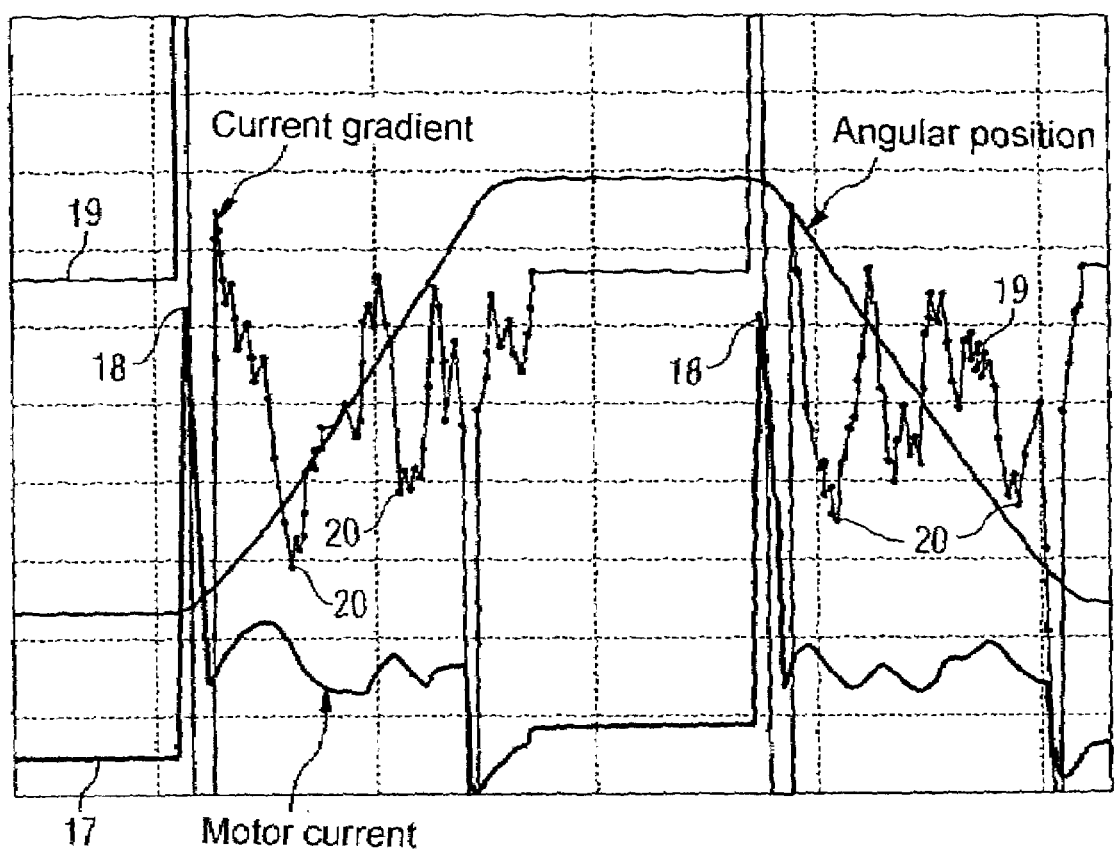

DEVICE AND METHOD FOR DETERMINING GEARBOX POSITIONS IN AN AUTOMATIC GEARBOX

CROSS REFERENCE TO RELATED APPLICATION

This application is a continuation of copending International Application No. PCT/DE03/01110 filed Apr. 3, 2003 which designates the United States, and claims priority to German application no. 102 15 116.4 filed Apr. 5, 2002.

TECHNICAL FIELD OF THE INVENTION

The present invention relates to a device and method for determining gearbox positions in an automatic gearbox comprising a notched disk arranged on a selector-range shaft, said notched disk mapping the position of a selector lever by means of a gate track consisting of depressions and elevations, with a pretensioned roller fixing the gearbox position.

DESCRIPTION OF THE RELATED ART

Automatic gearboxes with notched disks which map the position of the selector lever are known in many different embodiments. The various transmission steps are selected by the driver on a selector lever. The transmission step or gearbox position selected on the selector lever is transferred by means of a mechanical link to the notched disk. A roller pretensioned by a spring engages with the notched disk, said roller fixing the gearbox position clearly.

DE 196 28 099 discloses an automatic gearbox for motor vehicles comprising a notched disk mapping the position of a selector lever. A pretensioned holding roller engages with the notched disk and fixes the transmission step selected. When a selection movement is initiated, the pretensioning force of the holding roller is reduced and the insertion of a new transmission step is thereby made easier.

In a further development of the conventional automatic gearbox, the selector lever for selecting the transmission steps or gearbox positions and the notched disk are mechanically decoupled. The selection of the transmission step is no longer transferred to the notched disk mechanically but, for example, via an electrical signal. In order to ensure wear- and trouble-free operation of the automatic gearbox, the gearbox position has to be set exactly.

A device is known from publication DE 40 39 842 C1 for determining gearbox positions in an automatic gearbox comprising a notched disk arranged on a selector-range shaft, said notched disk mapping the position of a selector lever by means of a gate track consisting of depressions and elevations. Here, a pretensioned roller element fixes the gearbox position. An adjustment device is provided for rotating the notched disk about an axis of rotation of the selector-range shaft. The position of the notched disk is recorded with the aid of a potentiometer. A control unit emits a control signal corresponding to the position of the selector lever.

SUMMARY OF THE INVENTION

The object of the present invention is therefore, in an automatic gearbox in which the selector lever and the notched disk are mechanically decoupled, to determine the gearbox position on the notched disk exactly and reliably.

The object can be achieved by a device for determining gearbox positions in an automatic gearbox comprising a notched disk arranged on a selector-range shaft, said notched disk mapping the position of a selector lever by means of a gate track consisting of elevations and depressions, a pretensioned roller fixing the gearbox position, an adjustment device for rotating the notched disk about an axis of rotation of the selector-range shaft, a first sensor for determining the torque applicable by the adjustment device for rotating the notched disk when the adjustment device rotates the notched disk, a second sensor for determining the position of the notched disk, and a regulating device for detecting the gearbox positions of the automatic gearbox based on the values determined by the first and second sensors.

The adjustment device can be an electric motor. The first sensor may determine the current consumption and/or the voltage of the electric motor when the electric motor rotates the notched disk. The second sensor can be an angle sensor on the selector-range shaft. The first and second sensors may continuously record the values to be determined. The electric motor can be connected by means of a spindle to the selector-range shaft. The device can be mounted on the gearbox casing. A memory may store the values determined by the first and second sensors. The device can be fashioned as an add-on module.

The object can furthermore be achieved by a method for determining the gearbox positions of an automatic gearbox comprising a notched disk arranged on a selector-range shaft, said notched disk mapping the position of a selector lever by means of a gate track consisting of elevations and depressions, with a pretensioned roller fixing the gearbox position, comprising the steps of rotating the notched disk in a first direction by means of an adjustment device, detecting a first gearbox end position which is defined by an outermost depression of the notched disk, rotating the notched disk in a second direction by means of an adjustment device, detecting a second gearbox end position which is defined by an outermost depression of the notched disk, determining during the rotations of the notched disk the torque applied by the adjustment device for rotating the notched disk by means of a first sensor and the position of the notched disk by means of a second sensor, and determining at least one gearbox position, based on the values determined by the first and second sensors.

A gearbox position can be determined based on the values determined by the first and second sensors and all other gearbox positions can be calculated based on the gearbox position determined and the geometry of the notched disk. Every gearbox position can be determined based on the values determined by the first and second sensors. A gearbox position can be determined by multiple to-and-fro movements of the notched disk. The method can be executed when a vehicle is started up and/or when the gearbox positions are being changed when the vehicle is running. A gearbox position can be defined as a gearbox position lying between the gearbox end positions.

In an automatic gearbox comprising a notched disk rigidly connected to a selector-range shaft, the position of the selector lever is mapped on the notched disk by a gate track consisting of depressions and elevations, a pretensioned roller fixing the gearbox position. The inventive device for determining the gearbox position of such an automatic gearbox comprises an adjustment device for rotating the notched disk about an axis of rotation of the selector-range shaft, a first sensor for determining, when the adjustment device rotates the notched disk, the torque which has to be applied by the adjustment device in order to rotate the notched disk and a second sensor for determining the position of the notched disk. Furthermore, the device according to the invention comprises a regulating device for detecting or determining the gearbox position of the automatic gearbox on the basis of the values determined by the first and the second sensors. By means of the device according to the invention, the gearbox positions or transmission-step positions can be determined automatically. No external, additional device is required in order to determine the gearbox positions. In order to determine the gearbox positions exactly, two sensors are required. Based on the values determined by the first and second sensors, the precise gearbox position is determined by the regulating device, so that mechanical tolerance variances of the notched disk can be compensated for. Manufacturing-related tolerances, tolerances due to assembly and batch-dependent tolerances can be compensated for by means of the device for determining the gearbox positions. Changes in the notched disk as a result of friction or wear during operation of the automatic gearbox can also be compensated for by the device according to the invention.

In an advantageous embodiment of the device, the adjustment device is an electric motor. Electric motors are small and can therefore be used in a space-saving manner. They are also distinguished in that they are inexpensive. Where an electric motor is used as an adjustment device, the position of the selector lever can be converted into an electrical signal and routed directly via the bus, for example, the CAN bus, present in the vehicle as an actuating signal to the electric motor.

Advantageously, the first sensor determines the current consumption and/or the voltage of the electric motor when the electric voltage rotates the notched disk. The current consumption of the electric motor can be determined easily and reliably. From the current consumption of the electric motor, the geometry of the notched disk can be traced directly. Besides the current consumption, the voltage of the electric motor can also be measured. According to another preferred embodiment of the invention, the torque of the adjustment device is determined by means of foil strain gauges.

The second sensor is preferably fashioned as an angle sensor on the selector-range shaft. By means of the angle sensors, an exact determination of the position of the selector-range shaft and thus of the notched disk can be carried out. The angle sensors function reliably and prove not to be fault-susceptible. Angle sensors can be obtained in small and compact designs. They can be mounted on the selector-range shaft easily and with great outlay. By virtue of their compact construction, they are also retrofittable.

The first and the second sensors preferably record continuously the values to be determined. Consequently, the temporal courses of the values determined by the first and the second sensors are available with a high resolution. Because of the large number of values determined by the sensors, precise determination of the gearbox position is possible. Furthermore, the complete courses of the values provide an accurate reproduction of the geometry of the notched disk. Exact determination of the gearbox position results in trouble-free and wear-free operation of the automatic gearbox.

The electric motor is advantageously connected to the selector-range shaft by means of a spindle. Through the spindle, gearing can be achieved between the electric motor and the selector-range shaft. In this way, exact control and movement of the selector-range shaft and thus of the notched disk are possible.

In a preferred embodiment, the device is fastened to the gearbox casing. This allows space-saving and compact assembly. Furthermore, mounting on the gearbox casing enables the forces produced by the adjustment device to be transferred to the selector-range shaft.

In an advantageous embodiment of the invention, the values determined by the first and the second sensors are stored in a memory. The stored values are also available at a later time, so that when the gearbox positions or different transmission steps are selected, the relevant gearbox positions of the notched disk can be located exactly. Similarly, the values stored in the memory can be used for diagnostic purposes or for generating a history of the automatic gearbox.

In a preferred embodiment, the device is fashioned as an add-on module. In this way, the device can not only be integrated into new automatic gearboxes but also mounted or retrofitted on existing gearboxes. It is particularly preferable here for the electric motor of the device also to be used as the actual adjustment mechanism of the gearbox.

The method according to the invention for determining the gearbox positions of an automatic gearbox, comprising a notched disk arranged on a selector-range shaft, said notched disk mapping the position of a selector lever by means of a gate track consisting of depressions and elevations, with a pretensioned roller fixing the gearbox positions, comprises the following steps:

The notched disk is rotated in a first direction by means of an adjustment device. A first gearbox end position, which is defined by an outermost depression of the notched disk, is detected. In the next step, the notched disk is rotated in a second direction by means of the adjustment device. In a further step, the second gearbox end position is detected, which is defined by an outermost depression on the opposite side of the notched disk, whereby, during the rotations of the notched disk, the torque applied by the adjustment device to rotate the notched disk is determined by a first sensor and the position of the notched disk is determined by a second sensor. Subsequently, at least one gearbox position is determined, based on the values determined by the first and second sensors.

The course of the values determined by the first sensor represents the geometry of the notched disk. The exact gearbox positions can readily be determined from the course. It is advantageous that the method according to the invention is also applicable to different notched disks. Consequently, the exact gearbox positions can in each case be determined for different notched disks. In this way, the method is applicable to any automatic gearboxes with notched disks. The method is also applicable where, in the event of a defect in the automatic gearbox, the notched disk is being replaced. After replacement of the notched disk, the method ensures trouble-free and wear-free operation of the automatic gearbox.

The method particularly advantageously determines a gearbox position, based on the values determined by the first and the second sensors, and all other gearbox positions are calculated based on the determined gearbox position and the geometry of the notched disk. The method is distinguished by being particularly fast and by being capable of determining the gearbox positions sufficiently accurately. Furthermore, the calculation can also be carried out during drive operation.

In the method, each gearbox position is preferably determined based on the values determined by the first and second sensors. In this way, greater accuracy can be achieved in determining the individual gearbox positions.

Using this method, manufacturing tolerances in the gate track of the notched disk can be compensated for particularly well.

The exact determination of each gearbox position ensures wear-free operation of the automatic gearbox.

According to a preferred embodiment of the present invention, a gearbox position is determined by multiple to-and-fro movement of the notched disk. This simple method enables very accurate determination of the gearbox positions. When the notched disk is moved to and fro in the range of a gearbox position, very good results can be achieved in terms of the accuracy of determination of the exact gearbox position. When the notched disk is moved to and fro across the entire adjustment range, i.e. between the two gearbox end positions, the overall accuracy of the method can be optimized. Measurement errors and inaccuracies caused by external environmental influences in determining the values recorded by the first and second sensors and in determining the gearbox positions are compensated for. Similarly, the gearbox positions determined can be averaged. Furthermore, the facility exists for carrying out statistical analyses in relation to the gearbox positions or the quality of the method.

Advantageously, the method is executable when a vehicle is being started up and/or while the gearbox positions are being changed when the vehicle is running. The facility for the method to be executed several times means that the method can also compensate for environmental influences and temperature and humidity fluctuations which can influence the gearbox position. Tolerances which can occur as a result of friction or wear on the notched disk can be taken into account through repetition of the method when the vehicle is started up or while the vehicle is running. This ensures that the automatic gearbox functions with a low rate of wear over the entire service life of the vehicle and of the automatic gearbox.

In the method, the gearbox position of a gearbox position lying between the gearbox end positions is preferably determined. The values determined by the first and second sensors for the gearbox position lying between the gearbox end positions are available to a high degree of accuracy and permit exact analysis of the values. This enables optimal determination of the exact gearbox position.

The device according to the invention and the method according to the invention can be used in particular for teaching-in the gearbox positions in an automatic gearbox in which the selector lever and the notched disk are mechanically decoupled.

BRIEF DESCRIPTION OF THE DRAWINGS

The invention is described in detail below with reference to the drawings in which FIG. 3 shows a course of the angular position of the notched disk and a course of the motor current of an electric motor and a course of the current gradient pertaining to the motor current.

DETAILED DESCRIPTION OF THE PREFERRED EMBODIMENTS

Figure 1:
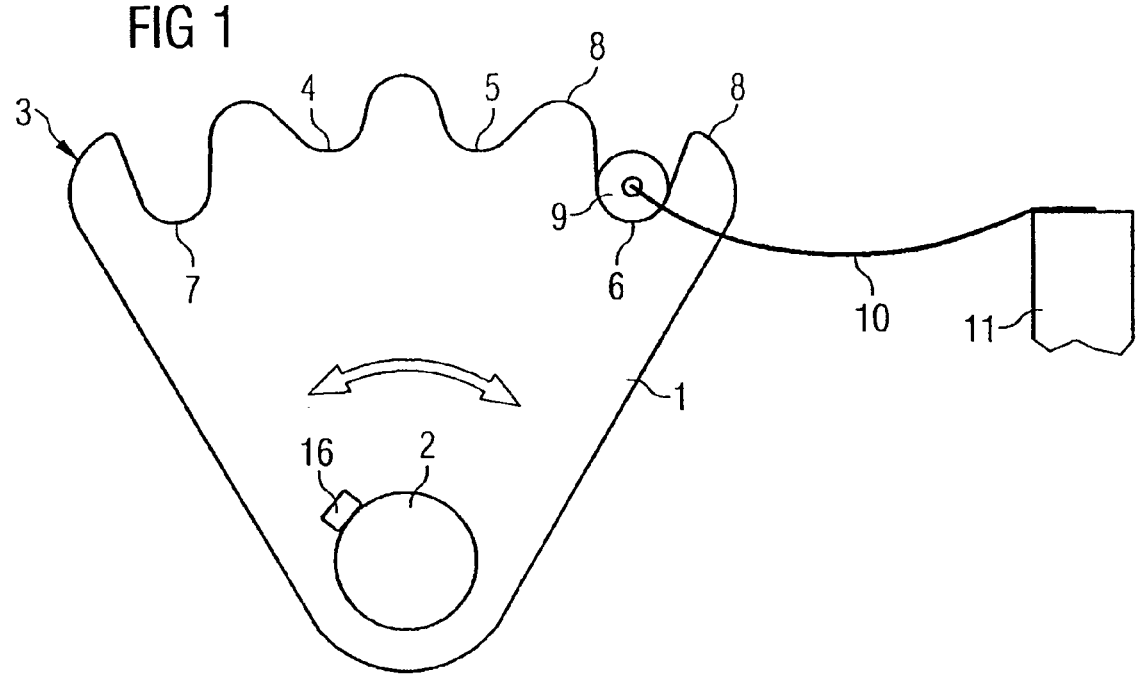
FIG. 1 shows a schematic sketch of a notched disk of an automatic gearbox according to an embodiment of the present invention.

The notched disk 1 in FIG. 1 is rigidly connected to a selector-range shaft 2. The notched disk 1 is rotatable to and fro, together with the selector-range shaft 2, about the axis of rotation of the selector-range shaft 2. On the face opposite the selector-range shaft 2, the notched disk has a gate track 3 with multiple depressions and elevations 8. The two outermost depressions represent the first and second gearbox end positions 6, 7. They simultaneously define the maximum range of adjustment of the notched disk 1. The first gearbox end position 6 corresponds to the park position P of the selector lever, the second gearbox end position 7 corresponds to the transmission step D of the selector lever. The two central depressions correspond to the other gearbox positions 4, 5, which reflect the N (neutral) position and the R (reverse) position of the selector lever. The two gearbox end positions 6, 7 have a deeper depression than the two gearbox positions 4, 5 for the N and R positions of the selector lever. It should be noted that the present invention can also be used in a gearbox having more than four gearbox positions, e.g. P, N, R, 1, 2, D, etc.

A roller 9 lies in the first gearbox end position 6. The roller 9 is fastened with a spring 10 to the gearbox casing 11. Through pretensioning of the spring 10, the roller 9 presses into the gearbox end position 6, thereby fixing a selected transmission step. In order to move the notched disk 1 and thus to change the gearbox position or transmission step, a torque has to be applied. This torque can be measured by a sensor (not shown here). When a gearbox end position 6, 7 is quit, i.e. when the drive position D or the P position is changed from, a higher torque is required than when changing from gearbox positions 4, 5, i.e. from the positions N, R.

Figure 2:
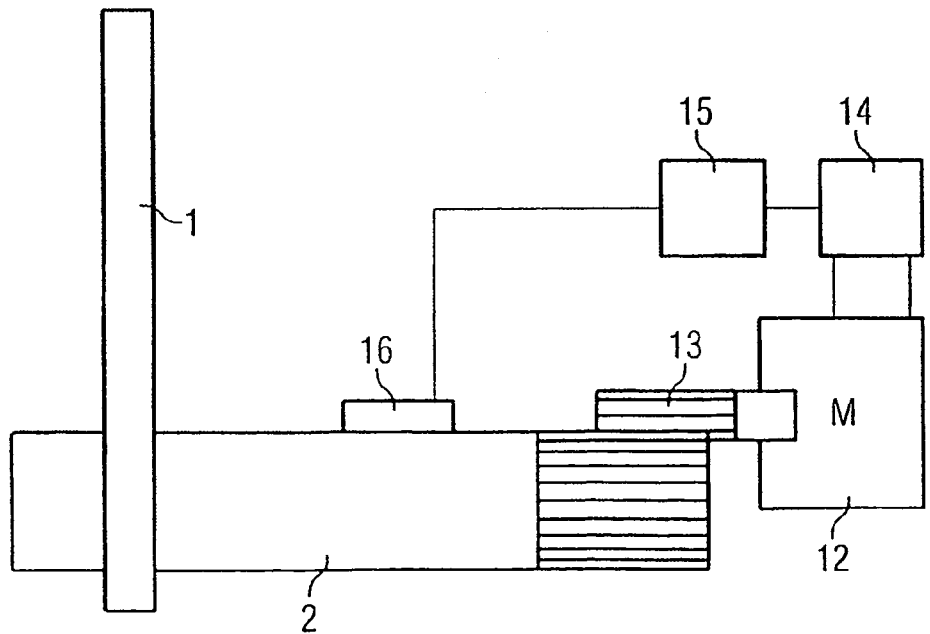
FIG. 2 shows a schematic diagram of the device according to the invention comprising a notched disk and selector-range shaft.

FIG. 2 shows the notched disk 1 and the selector-range shaft in side elevation. A spindle 13 is arranged between the selector-range shaft 2 and an electric motor 12. The electric motor 12 drives the selector-range shaft 2 via the spindle 13 and thus moves the notched disk 1 to and fro. A first sensor 14, which is fashioned as a current measurement device, is arranged on the electric motor 12. The first sensor 14 measures the current consumption of the electric motor 12. The first sensor 14 is connected to a regulating device 15. The values determined by the first sensor 14 are transferred to the regulating device 15. They reflect the geometry of the notched disk 1 or of the gate track 3. A second sensor 16 is mounted on the selector-range shaft 2 and connected to the regulating device 15.

The position of the selector-range shaft 2 is measured by the second sensor 16, which is an angle sensor. The values determined by the second sensor 16 are processed in the regulating device 15 together with the values of the first sensor 14.

In order to determine precisely the gearbox positions 4, 5 or the gearbox end positions 6, 7 of the notched disk 1, the electric motor is run at a constant voltage with pulse-width modulation (PWM) in the direction of one of the gearbox end positions 6, 7 (P or D position). Before the gearbox end position 6, 7 is reached, the voltage on the electric motor is reduced, as a result of which the input current is increased. A gentle approach to the limits stops can be achieved by this means. The electric motor 12 is run at this reduced voltage until such time as the motor current changes sharply and the current gradient assumes a maximum value. This indicates one of the gearbox end positions 6, 7 and at the same time the end position of the notched disk 1. The second sensor 16 determines the current angular position of the selector-range shaft 2, said angular position characterizing the gearbox end position 6, 7.

The notched disk 1 is then run in the opposite direction until the corresponding gearbox end position 6, 7 is also detected there. The maximum adjustment range of the notched disk 1 is determined by this means.

From the geometry of the notched disk 1 and the maximum adjustment range of the notched disk 1 known from the previously determined gearbox end positions 6, 7 "search windows" as they are called are calculated for the other gearbox positions 4, 5 or the different transmission steps. A search window characterizes a range about the respective gearbox position 4, 5 in which the gearbox position 4, 5 concerned has to be determined precisely.

In a further step, the exact gearbox positions 4, 5 are then sought in the previously established search windows. To this end, the maximum adjustment range of the notched disk 1 is traveled in both directions, and the motor voltage of the electric motor 12 is held constant. While the entire adjustment range of the notched disk 1 is traveled, the present current and the present angular position are measured cyclically by the first and the second sensors 14, 16 and communicated to the regulating device 15. The measurement values can be forwarded to a memory and stored.

The current gradient is calculated from the current course determined. The local current gradient minima are detected from the course of the current gradient. The covered current minimum which lies between two current gradient minima is then taken and the associated angular position of the selector-range shaft 2 sought. The two current gradient minima (change of current gradient from negative to positive) represent the two ends of the depression on the notched disk 1 lying in the search window. The midpoint between the two ends marks the sought gearbox position 4, 5. In this way the gearbox position 4, 5 can be determined exactly. Manufacturing or installation tolerances of the notched disk 1 can be compensated for. A change in the notched disk 1 caused by wear or temperature fluctuations can likewise be taken into account.

The accuracy of the individual gearbox positions 4, 5 can be further increased by multiple repetition of this search method.

FIG. 3 shows the course of the angular position of the notched disk 1, all the angular positions of the notched disk 1 from the first gearbox end position 6 to the second gearbox end position 7 and back again as far as the first gearbox end position 6 being displayed. The angular position is determined by the second sensor 16.

The current consumption of the electric motor 12 is shown in the curve 17 traced in the diagram below. The motor current represents the torque which the electric motor 12 has to apply to move the notched disk 1. When the notched disk 1 is moved from the gearbox end positions 6, 7, a high torque has to be applied by the electric motor 12, which is reflected in the course of the motor current. The course of the motor current then has a high extreme value 18 in each case.

Changes in the motor current are shown by the curve 19 of the current gradient. The course of the current gradient reproduces very accurately the geometry of the notched disk 1.

As soon as the notched disk 1 is moved from one of the gearbox end positions 6, 7, the electric motor 12 assumes a high current consumption. The curve 19 of the current gradient then displays an "infinity point". When the notched disk 1 is rotated out of one of the gearbox positions 4, 5, the curve 19 of the current gradient shows a local extremum (20). The local extrema 20 (minima) of the current gradient thus represent precisely the gearbox positions 4, 5 of the notched disk 4, 5.

The preceding description of the exemplary embodiment according to the present invention serves only for illustrative purposes and not for the purpose of restricting the invention. Within the scope of the invention, various changes and modifications are possible without departing from the scope of the invention and of its equivalent.

We claim:

1. A device for determining gearbox positions in an automatic gearbox comprising:
    a notched disk arranged on a selector-range shaft, said notched disk mapping the position of a selector lever by means of a gate track consisting of elevations and depressions, wherein said notched disk has a first end position and a second end position and at least one intermediate position wherein a rotation beyond the first and second end position is prohibited,
    a pretensioned roller fixing the gearbox position,
    an adjustment device for rotating the notched disk about an axis of rotation of the selector-range shaft,
    a first sensor for determining the torque applicable by the adjustment device for rotating the notched disk when the adjustment device rotates the notched disk,
    a second sensor for determining the position of the notched disk, and
    a regulating device for detecting the gearbox positions of the automatic gearbox based on the values determined by the first and second sensors.

2. The device according to claim 1, wherein the adjustment device is an electric motor.

3. The device according to claim 2, wherein the first sensor determines the current consumption and/or the voltage of the electric motor when the electric motor rotates the notched disk.

4. The device according to claim 3, wherein a gradient of the current or voltage is determined.

5. The device according to claim 2, wherein the electric motor is connected by means of a spindle to the selector-range shaft.

6. The device according to claim 1, wherein the second sensor is an angle sensor on the selector-range shaft.

7. The device according to claim 1, wherein the first and second sensors continuously record the values to be determined.

8. The device according to claim 1, wherein the device is mounted on the gearbox casing.

9. The device according to claim 1, wherein a memory stores the values determined by the first and second sensors.

10. The device according to claim 1, wherein the device is fashioned as an add-on module.

11. A method for determining the gearbox positions of an automatic gearbox comprising a notched disk arranged on a selector-range shaft, said notched disk mapping the position of a selector lever by means of a gate track consisting of elevations and depressions, with a pretensioned roller fixing the gearbox position, comprising the steps of:
    rotating the notched disk in a first direction by means of an adjustment device,
    detecting a first gearbox end position which is defined by an outermost depression of the notched disk,
    rotating the notched disk in a second direction by means of an adjustment device,
    detecting a second gearbox end position which is defined by an outermost depression of the notched disk, determining during the rotations of the notched disk the torque applied by the adjustment device for rotating the notched disk by means of a first sensor and the position of the notched disk by means of a second sensor, and determining at least one gearbox position, based on the values determined by the first and second sensors.

12. The method according to claim 11, wherein a gearbox position is determined based on the values determined by the first and second sensors and all other gearbox positions are calculated based on the gearbox position determined and the geometry of the notched disk.

13. The method according to claim 12, wherein a gearbox position is defined as a gearbox position lying between the gearbox end positions.

14. The method according to claim 11, wherein every gearbox position is determined based on the values determined by the first and second sensors.

15. The method according to claim 11, wherein a gearbox position is determined by multiple to-and-fro movements of the notched disk.

16. The method according to claim 11, wherein the method is executed when a vehicle is started up and/or when the gearbox positions are being changed when the vehicle is running.

17. A device for determining gearbox positions in an automatic gearbox comprising:
a notched disk arranged on a selector-range shaft, said notched disk mapping the position of a selector lever by means of a gate track consisting of elevations and depressions, wherein said notched disk has a first end position and a second end position and at least one intermediate position wherein a rotation beyond the first and second end position is prohibited,
a pretensioned roller fixing the gearbox position,
an electric motor for rotating the notched disk about an axis of rotation of the selector-range shaft,
a first sensor for determining the torque applicable by the adjustment device for rotating the notched disk when the adjustment device rotates the notched disk, wherein the first sensor determines the current consumption and/or the voltage of the electric motor when the electric motor rotates the notched disk,
a second sensor for determining the position of the notched disk, and
a regulating device for detecting the gearbox positions of the automatic gearbox based on the values determined by the first and second sensors.

18. The device according to claim 17, wherein the second sensor is an angle sensor on the selector-range shaft.

19. The device according to claim 17, wherein the first and second sensors continuously record the values to be determined.

20. The device according to claim 17, wherein the device is mounted on the gearbox casing.

21. The device according to claim 17, wherein a memory stores the values determined by the first and second sensors.

* * * * *